(12) United States Patent
Holland

(10) Patent No.: US 11,818,680 B2
(45) Date of Patent: Nov. 14, 2023

(54) SYSTEM AND METHOD FOR REMOTE COMMUNICATION AMONG PRIVATE GROUPS ON A CRUISE SHIP

(71) Applicant: Chemia Denise Holland, Clayton, NC (US)

(72) Inventor: Chemia Denise Holland, Clayton, NC (US)

(73) Assignee: Chemia Denise Holland, Morrisville, NC (US)

( * ) Notice: Subject to any disclaimer, the term of this patent is extended or adjusted under 35 U.S.C. 154(b) by 0 days.

(21) Appl. No.: 17/357,952

(22) Filed: Jun. 24, 2021

(65) Prior Publication Data
US 2023/0164731 A1 May 25, 2023

(51) Int. Cl.
*H04W 4/12* (2009.01)
*H04W 64/00* (2009.01)
*H04W 8/00* (2009.01)
*G06Q 50/30* (2012.01)

(52) U.S. Cl.
CPC ............ *H04W 64/00* (2013.01); *G06Q 50/30* (2013.01); *H04W 4/12* (2013.01); *H04W 8/005* (2013.01)

(58) Field of Classification Search
CPC ....... H04W 64/00; H04W 4/12; H04W 8/005; G06Q 50/30
See application file for complete search history.

(56) References Cited

U.S. PATENT DOCUMENTS 10,009,868 B1 * 6/2018 Reyes ................ G06Q 30/0261
2022/0169388 A1 * 6/2022 Sandeen .......... G06Q 10/06315

\* cited by examiner

*Primary Examiner* — Justin Y Lee

(57) ABSTRACT

The present invention relates to a system and method to allow passengers and users of cruise ships to communicate with each other via group chats and texts. Through the system and method of the present invention, users will be able to locate each other, communicate with each other, arrange for rendezvous', and otherwise keep in touch, while on large cruise ship environments.

15 Claims, 5 Drawing Sheets

SYSTEM AND METHOD FOR REMOTE COMMUNICATION AMONG PRIVATE GROUPS ON A CRUISE SHIP

The present invention relates to a system and method to allow passengers and users of cruise ships to communicate with each other via group chats and texts. Through the system and method of the present invention, users will be able to locate each other, communicate with each other, arrange for rendezvous', and otherwise keep in touch, while on large cruise ship environments.

BACKGROUND

Cruise ships have grown larger in size in order to increase the offerings and experiences of cruisers on the ships, and to accommodate more cruisers for any particular voyage. The larger cruise ships are thus more attractive to cruisers and cruise ship companies themselves. However, the increase in size of ships has reduced the familiarity of the ship surroundings, and the ability of cruisers to connect with family members and friends whom they boarded with. In many circumstances, family members and friends only see each other during agreed upon meal times.

Whereas cruisers have mobile phones and other devices, many times the mobile phones are useless when the cruise ship is in international waters. The cruise ships often don't have readily available internet connection, and if they do, it is extremely limited. Methods of mobile communication, such as text or social media, may be difficult to use or have limited usefulness, in international waters.

There is a need in the art for a system and method to allow passengers on cruise ships to be able to connect with a specific group whom they may be part of. For example, the group may consist of a group of friends, a group of family members, or a group of work colleagues. The system of the present invention allows communications to be sent to different members of the group, using the internet service of the cruise ship. The system of the present invention also allows members of a group to determine the position and location of another member of their group. Through the system of the present invention, users will be able to readily locate other members as well as communicate with the other members of the group.

QR codes, designed for tracking parts in vehicle manufacturing, have become ubiquitous on account of the wide range of applications that have been found for them, including advertising, commercial tracking, entertainment and transport ticketing, product-loyalty marketing (e.g., QR codes used for coupons that can be redeemed using a mobile app for QR code decoding), and in-store product labeling as well as on account of their fast readability and greater storage capacity compared to the older UPC bar codes. Many applications (apps) are now available enabling, for example, a smartphone to be used as a QR code scanner that displays the QR code and converts it to some useful form (such as standard uniform resource locator (URL) for a website, so that a user does not have to type the URL into a web browser to go to the site).

To illustrate a few examples of the use of such apps, users may receive text, add a vCard contact to their device, open a uniform resource identifier (URI), or compose an e-mail or text message after scanning QR codes. Users can generate and print their own QR codes for others to scan and use by visiting or using one of several pay or free QR code-generating sites or apps. Apps for scanning QR codes can be found on nearly all smartphone devices, QR codes storing information such as addresses and URLs appear in magazines, on signs, on buses, on business cards, and on almost any object about which users might want information. Users with a camera phone equipped with a QR scanner application can scan the image of the QR code to display text or contact information, connect to a wireless network, or open a web page in the telephone's browser. In the shopping industry, the QR code has become a focus of advertising strategy, since, for example, it may provide quick and effortless access to a brand's website or other direct access to information wished to be shared by an advertiser. Beyond mere convenience to the consumer, one importance of this capability is that advertisers and marketers can use the behavior of scanning to encourage or aid consumers to buy their products, causing the use of QR codes to have a significant impact on advertising and marketing design. One example of such impact is an increase in what is known as conversion rate, e.g., the chance that contact with an advertisement will convert to a sale. Thus, improvements in the use of QR codes can have a beneficial effect on commerce and the economy.

BRIEF DESCRIPTION OF THE INVENTION

The present invention has as its goal giving passengers on a cruise vessel the ability to locate specific people in a group to which they belong. The present invention accomplishes this goal by utilizing a user interface downloaded to a mobile device of a passengers, whereby the user interface has the capability of connecting the user's mobile device to mobile devices of other users. Connection allows users in a particular group to communicate via mobile device with one another, even in spaces where there is no broadband connection, and it allows users to locate the position of other users within their group with the cruise ship vessel.

In one embodiment, the present method has the capability to triangulate the position of any particular user within a cruise ship, thereby determining the user's position along the x-axis, y-axis, and z-axis. The user's position can thus be determined between the bow and the stern of the ship, between the port and starboard, and the particular deck the user is on. The user will now be able to be located by other members of his group. By being able to be located by his group, group members can elect to meet at a central located place on the cruise ship.

In a further embodiment, the present method has the ability to allow ship cruisers to be able to give their location to other ship cruisers by scanning a QR code substrate, whereby the QR code substrate is located in specific areas of the ship. The QR code will provide information about the ship cruisers location, including the area of the ship where the code was scanned, the time the code was scanned, and the person who scanned the code. Scanning occurs through the use of a ship cruisers mobile device, whereby the device is connected to the ship's wireless signal. The QR code will be auto-transposed to a mobile based application to give the information about the ship cruisers location.

DESCRIPTION

Figure 1:
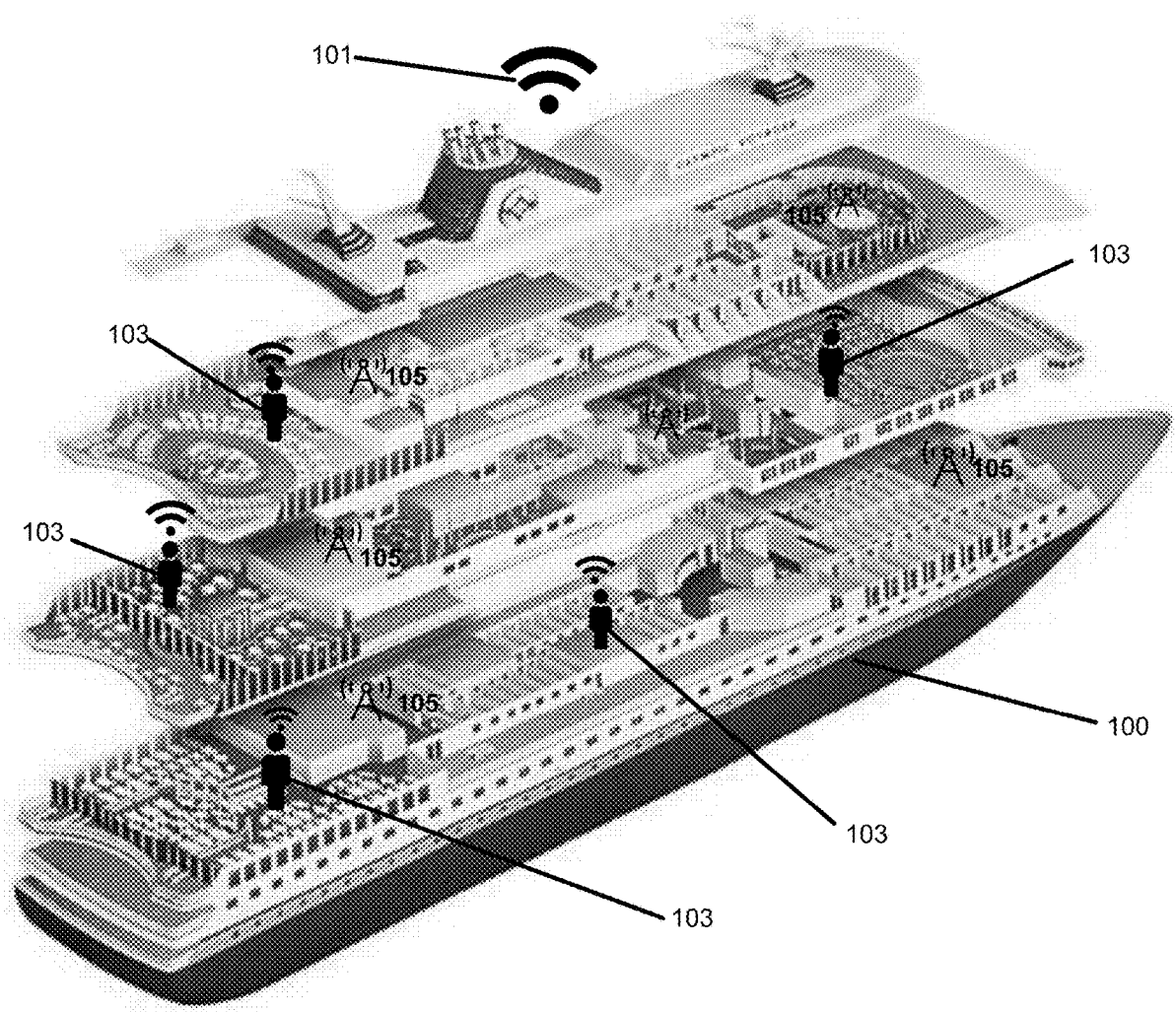
FIG. 1 is an embodiment of the present invention, whereby a cruise ship has installed therein capabilities to allow members of the group whom happen to be passengers on the cruise ship to communicate privately with each other.

FIG. 1 is an embodiment of the present invention, whereby a cruise ship capable of sailing a variety of waters possesses at least several decks, rooms, compartments, and sections throughout its body. Among the various decks, which can range from 3 to 20 decks, the cruise ship can include Casino, Shops—Only open when the ship is at sea to avoid merchandising licensing and local taxes, Spa, Fitness center, Library, Theatre with Broadway-style shows, Cinema, Indoor and/or outdoor swimming pool with water slides, Hot tub, Buffet restaurant, Lounges, Clubs, Pool tables, Ping pong tables, Infirmary and morgue Card room, Observation lounge, Karaoke, and Teen Lounges.

In general, passengers are able to traverse the ship in almost any area, to enjoy the amenities thereof. However, as the ship is so large and diverse, it is difficult to locate any particular person whom may be member of a particular group. Through the present invention, the wifi signal of the cruise ship 101 is able to assist in the triangulation of passengers 103 in terms of their position.

On a cruise ship in open waters, cruise ships generally do not have access to standard satellite communications. Because cruise ships possess internally a horizontal axis, a vertical axis, and a depth axis, standard means for global positioning, which is focused on the x-axis and y-axis position on the globe will not work. This is primarily because cruise ships have depth determination due to the ship's decks.

Through the present invention, passengers who may be within a particular group, such as a family or group of friends, will be able to communicate with each other using their mobile devices. In addition, the location of the members of the group will be known to other members of the group. Through the present invention, passengers can decide where to rendezvous on the cruise ship. The present invention doesn't require users to specifically describe where they may be—other members of their group will receive notification of their location on the cruise ship. For example, the system will deliver to member of a group "Robert is at the water slide!", or "Jane is in the Captain's Restaurant".

Figure 2:
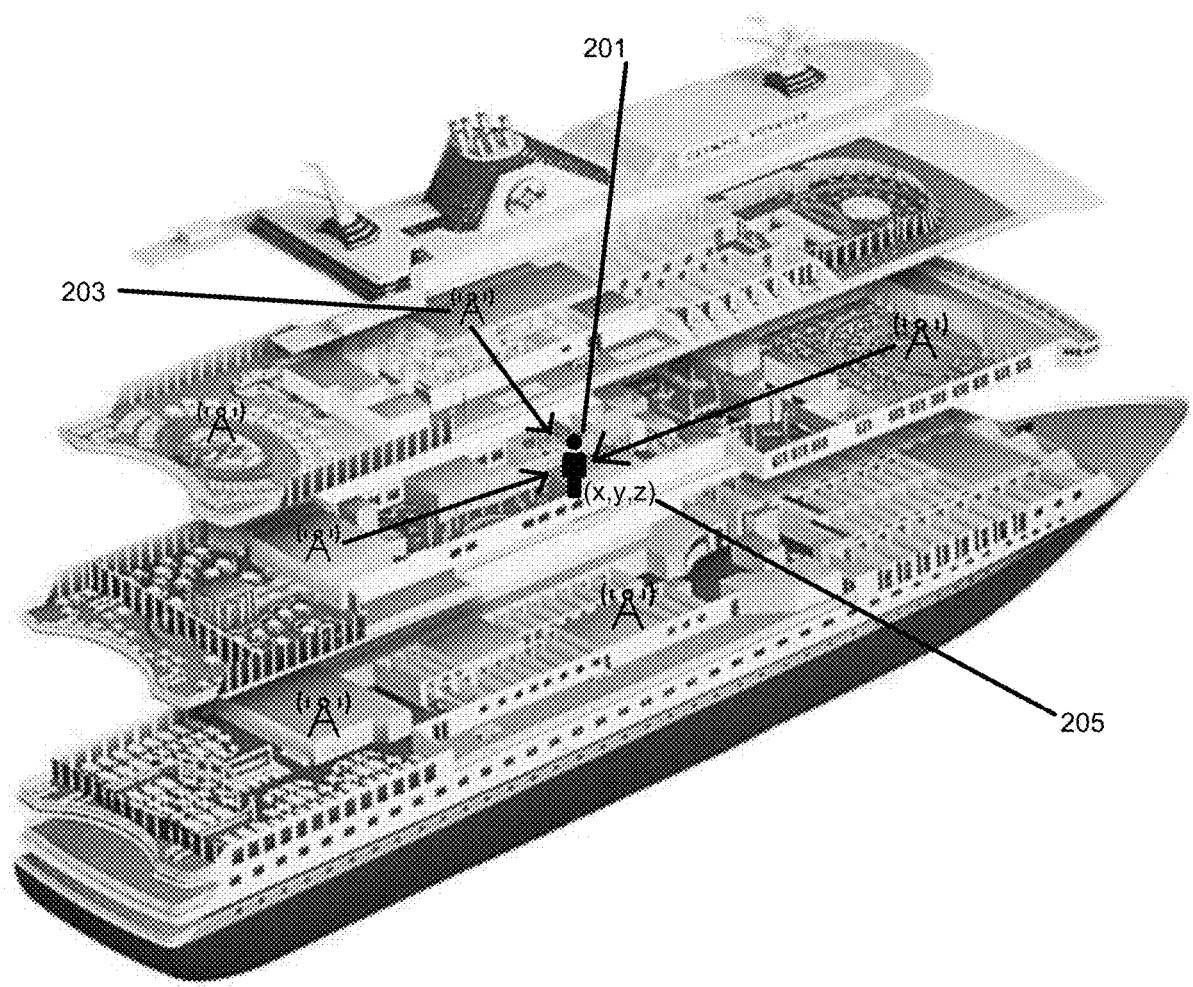
FIG. 2 is a further embodiment of the present invention.

FIG. 2 is an embodiment of the cruise ship whereby a passenger's location can be determined by the wireless network on a cruise ship. As shown, the cruise ship contains multiple signal ports 203 through the ship. In one embodiment, the signal ports are placed on every deck of the ship. In a preferred embodiment, every deck has 3 signal ports, positioned equidistant on the deck. The signal ports 203 throughout the ship allow the determination of the x,y,z location 205 for a passenger 201. In a preferred embodiment, the x,y,z location 205 determination will result in a description of the area of the passenger 201, for example "Restaurant", "pool room", etc. The description will then be made available to other users of a particular group.

Figure 3:
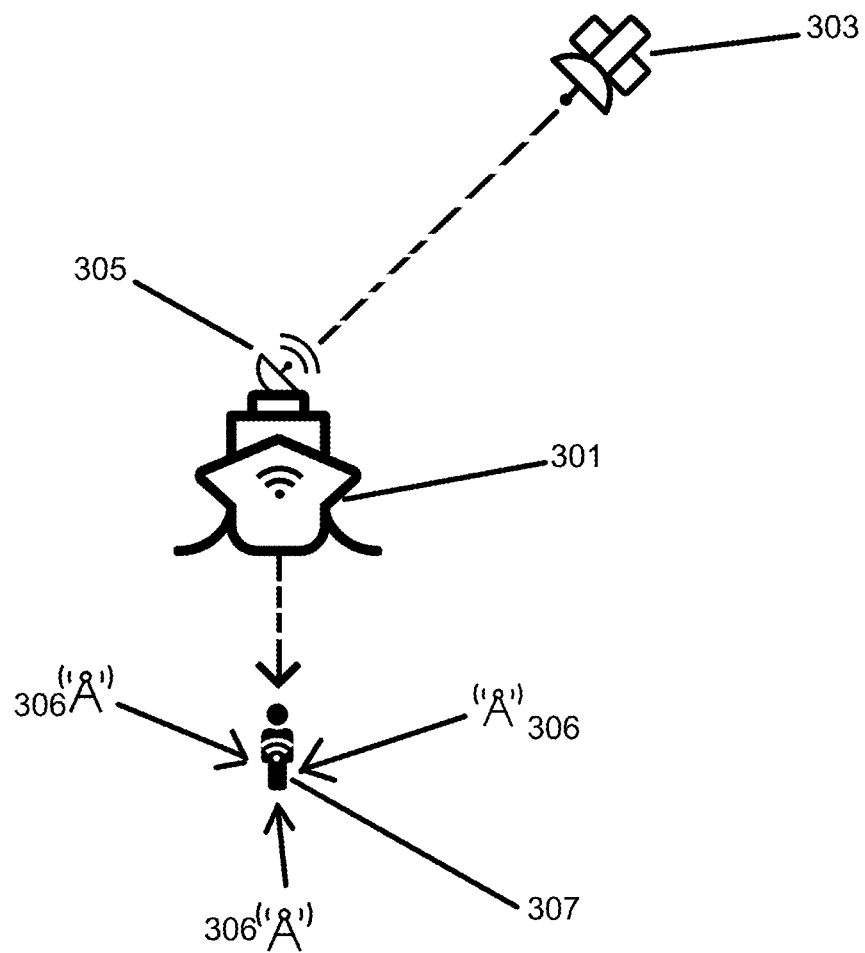
FIG. 3 is an embodiment of operation of the present invention.

FIG. 3 is an embodiment of the cruise ship that provides passengers with the ability to communicate over a secure network, as well as locate members of a particular group within the cruise ship. As shown, the cruise ship 301 possesses a communication means 305 that is capable of connecting to a orbital satellite communication means 303 while providing connection means 306 that will locate the position of a user 307 on the cruise ship 301.

The communication means 305 allows the cruise ship 301 to communicate via satellite means 303, and provide a communication channel by and between the passengers on the cruise ship 301. The communication means 305 can include ground station satellites positioned on the cruise ship. Ground station satellite allows the cruise ship to secure positioning information, such as global positioning. The communication means 305 is remotely connected to an orbital satellite communication means 303. The orbital satellite communication means 303 generally serves as a transponder to collect and receive digital messages from the the earth's surface.

Through the communication means 305, the cruise ship 301 can provide a method of communication for passengers, notably a wireless fidelity communication method. The method of communication for passengers can be accessed by the mobile phone or portable systems of the users, for example laptops and tablets. The method of communication to users occurs via connection means 306 such as wireless routers positioned throughout the cruise ship 301. Being positioned throughout the ship 301, the wireless routers 306 can triangulate the position of the passenger on the ship 301. As stated above, positioning can be in the x, y, and z, and translated into an exact named location on the ship 301.

Figure 4:
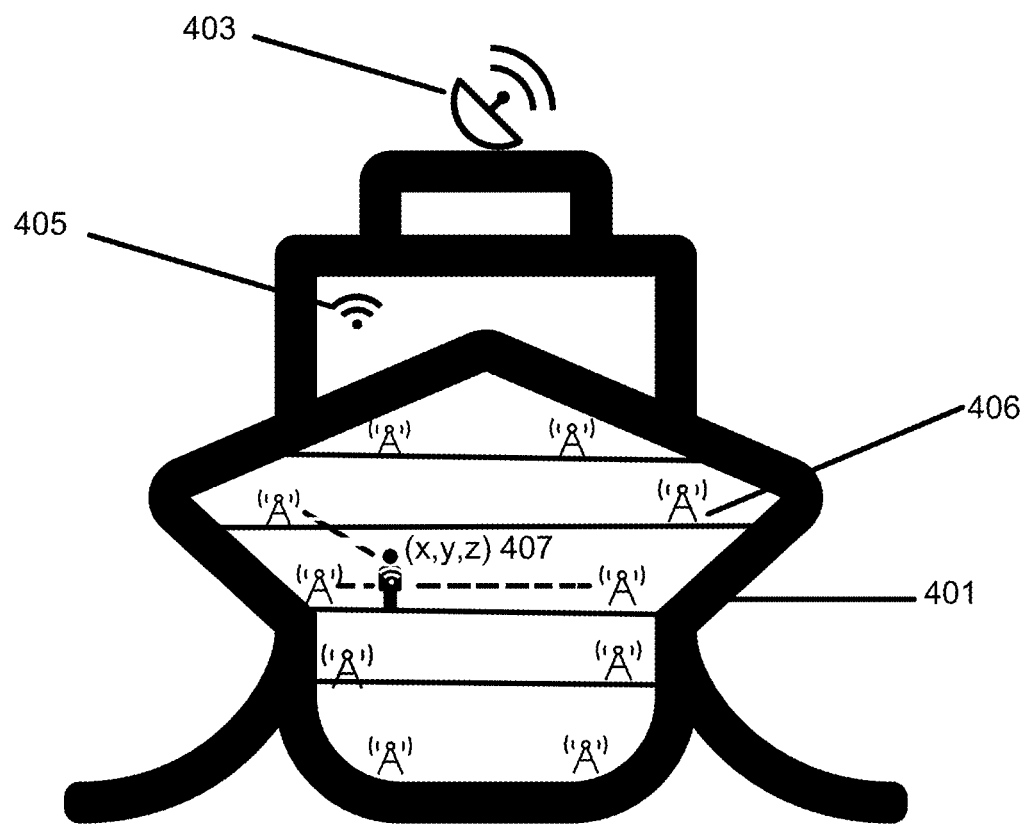
FIG. 4 a further embodiment of the method and system of the present invention.

FIG. 4 is an embodiment of the invention, whereby routers 406 are shown positioned throughout the ship 401. The routers 406 are able to triangulate the position of the passenger 407 on the ship 401 by communicating to the mobile device of the passenger 407. The routers 406 are in connection to a modem 405 centrally located on the cruise ship 401, whereby the modem 405 obtains its communication means through the satellite 403 of the cruise ship. By being located throughout the ship, on all decks and in all sections, the routers 406 can determine the location of the passenger based upon the passengers proximity to at least 3 routers 406. The passengers proximity to at least 3 routers 406 results in a determination of the x, y, and z positioning of the user. The x, y, and z positioning is translated into the nearest section of the ship to the user. The nearest section is then provided to other passengers in the group of the passenger 407.

Figure 5:
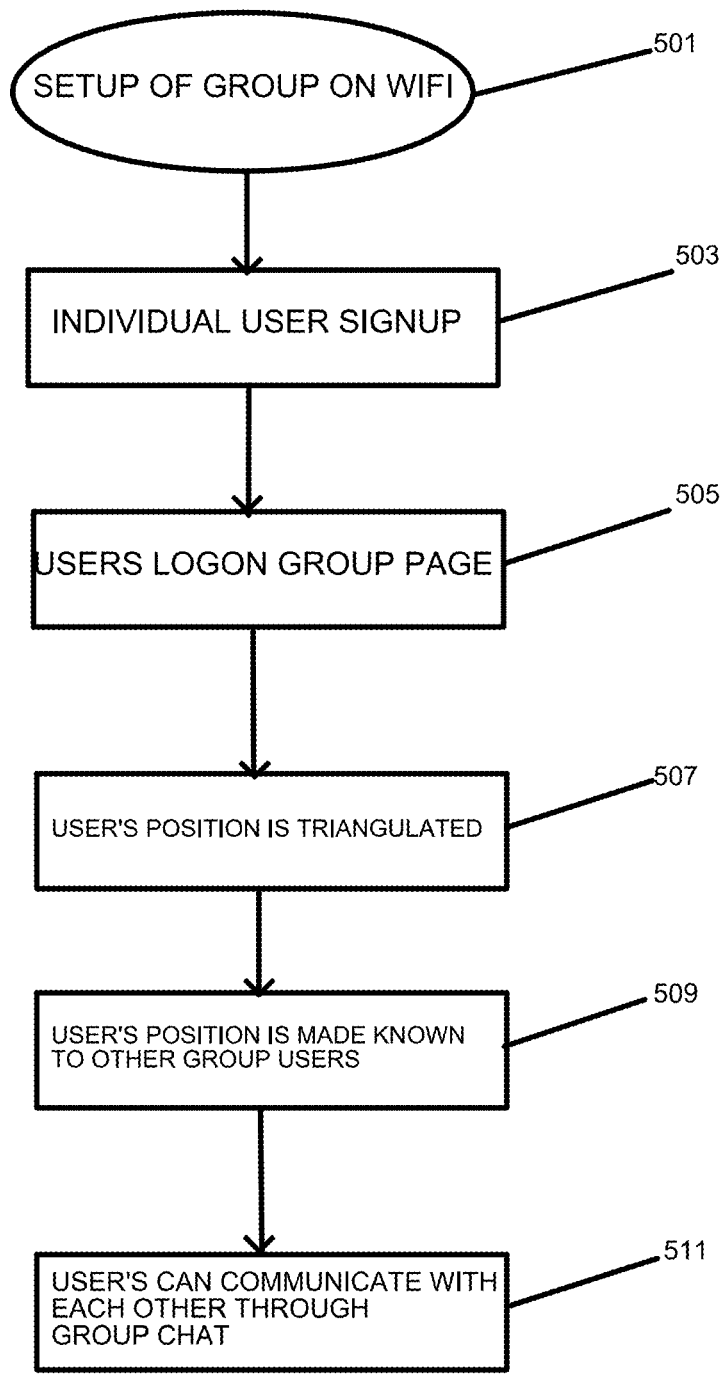
FIG. 5 is a method of the present invention.

FIG. 5 is an embodiment of the method of the present invention, whereby passengers are able to communicate with other passengers within their particular group, and passengers can determine the location of the other passengers within their group. Communication occurs through a digital user interface. The digital user interface has the ability to provide specific ID numbers for each passenger. The digital user interface preferably includes a digital representation of the map of the passenger cruise ship. The digital user interface is able to communicate through the wireless communication means of the mobile device. The digital user interface further preferably includes a payment mechanism as well as signup/lignin authentication for users.

Following boarding the cruise ship, passengers may set up a group organization on the cruise ships network 501. The group organization may be populated with known passengers of the user who has set up the group organization. In one embodiment, after setting up the group organization, the user may invite other passengers to the group. The group is set up and members join, via their mobile devices, including mobile phone, tablet, or laptop computer.

As stated, the first user signs up for the system of the present invention 503. The first user signs up for the system by providing user name, email address, and payment information. The user may also be required to provide other meta-data, such as address, cabin number, and the like.

A group login page is then created 505. For the first user and other users, their position is then triangulated by the system, providing an estimated x, y, and z location, and then translating that location to a particular stated area of the ship. This stated area of the ship will be communicated to other users in the particular group 509. In use, the users within a particular group will be able to communicate with each other through the text based system of the mobile phone 511.

I claim:

1. A system for determining the location of passenger on a passenger cruise ship, comprising: —a device for connecting to said passenger cruise ship's wireless network, whereby said device include a memory storage means, a scanning means, a display, a digital user interface downloaded onto the device, and a wireless communication means; —a means for determining the location of the passenger; a wireless network including all of the wireless routers; wherein said wireless network provides a network distributed throughout said passenger cruise ship, further comprising QR code substrates distributed on each deck of said cruise ship at key locations, wherein said key locations are selected from the group consisting of restaurants, fitness centers, play rooms, theaters, shops, clubs, and bars.

2. The system of claim 1, wherein said device is selected from the group consisting of a mobile phone, a tablet, a laptop computing device, a wrist-based computing device, and a digital watch.

3. The system of claim 1, whereby said passenger cruise ship has at least 3 decks.

4. The system of claim 1, whereby said wireless network provides a network among all decks of said passenger cruise ship.

5. The system of claim 1, whereby said wireless routers are distributed among all decks of said passenger cruise ship.

6. The system of claim 1, whereby there are numerous wireless routers distributed on each deck.

7. The system of claim 1, wherein determining the location of a first passenger on said passenger cruise ship, comprises the steps of: —connecting to at least one other passenger by said first passenger through said digital user interface; —determining the location of said first passenger through the use of said device; —communicating said location of said first passenger to said other passenger through said digital user interface; and —providing information relating to said location of said first passenger to said other passenger through said user interface.

8. The system of claim 7, wherein said digital user interface is downloaded by accessing a web-based database and agreeing to download said user interface to said device.

9. The system of claim 7, whereby connecting said first passenger to said other passenger comprises locating an ID of said other passenger through said digital user interface.

10. The system of claim 7, whereby determining the location of said first passenger comprises the steps of scanning the QR code substrate in a specific location of the passenger cruise ship.

11. The system of claim 7, whereby determining the location of said first passenger comprises the step of triangulating the location of the device through the use of various routers determining the distance of the device from each router.

12. The system of claim 11, whereby triangulating requires the use of said passenger cruise ships routers.

13. The system of claim 11, whereby said triangulation of said device is transposed to define a specific location of the mobile device on the passenger cruise ship.

14. The system of claim 13, further comprising the step of providing information about the location including a time the location was determined, an ID of the passenger's device being triangulated, and a name of the location.

15. A system for determining the location of a first passenger on a passenger on a cruise ship, comprising: —a device for connecting to said passenger cruise ship's wireless network, whereby said device include a memory storage means, a scanning means, a display, a digital user interface downloaded onto the device, and a wireless communication means; —a means for determining the location of the passenger; —a wireless network including at least three wireless routers; wherein said wireless network provides a network distributed throughout said passenger cruise ship, further comprising QR code substrates distributed on each deck of said cruise ship at key locations, wherein said key locations are selected from the group consisting of restaurants, fitness centers, play rooms, theaters, shops, club and bars; the system further comprising connecting to at least one other passenger by said first passenger through said digital user interface; —determining the location of said first passenger through the use of said device; —communicating said location of said first passenger through said digital user interface; and providing information relating to said location of said first passenger to said other passenger through said user interface.

* * * * *